United States Patent
Phillips

(10) Patent No.: US 8,352,735 B2
(45) Date of Patent: Jan. 8, 2013

(54) METHOD AND SYSTEM FOR ENCRYPTED FILE ACCESS

(75) Inventor: Anthony H. Phillips, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 12/361,268

(22) Filed: Jan. 28, 2009

(65) Prior Publication Data

US 2009/0210721 A1 Aug. 20, 2009

(30) Foreign Application Priority Data

Jan. 31, 2008 (EP) .................................. 08150873

(51) Int. Cl.
*H04L 9/00* (2006.01)
(52) U.S. Cl. .......................................... 713/165; 726/2
(58) Field of Classification Search ................... 713/165
See application file for complete search history.

(56) References Cited

U.S. PATENT DOCUMENTS

| | | | | |
|---|---|---|---|---|
| 5,584,023 | A * | 12/1996 | Hsu | 1/1 |
| 6,931,530 | B2 * | 8/2005 | Pham et al. | 713/165 |
| 2003/0056095 | A1 * | 3/2003 | Elliott et al. | 713/164 |
| 2003/0105734 | A1 * | 6/2003 | Hitchen et al. | 707/1 |
| 2006/0117063 | A1 | 6/2006 | Havewala et al. | |
| 2007/0150750 | A1 | 6/2007 | Kokubun | |
| 2008/0235765 | A1 * | 9/2008 | Shimizu | 726/2 |
| 2010/0153671 | A1 * | 6/2010 | Safa | 711/163 |

FOREIGN PATENT DOCUMENTS

| | | |
|---|---|---|
| EP | 0547741 A1 | 6/1993 |
| EP | 1253502 A2 | 10/2002 |
| EP | 1566720 A2 | 8/2005 |

OTHER PUBLICATIONS

Yu et al., "Applications of a Feather-weight Virtual Machine", Mar. 5-7, 2008, ACM, pp. 171-180.*
Pletka et al., "Cryptographic Security for a High-Performance Distributed File System", 2007, IEEE Computer Society, pp. 1-6.*
Park et al., "SPECS: Smart Partial Enciphering Service for Accessing Encrypted Files with Efficient and Transparent", Mar. 20-22, 2007, ACM, pp. 377-379.*

* cited by examiner

*Primary Examiner* — Matthew Smithers
(74) *Attorney, Agent, or Firm* — Steven M. Greenberg, Esq.; Carey, Rodriguez, Greenberg & O'Keefe

(57) ABSTRACT

A method and system for encrypted file access are provided. The method includes the steps of: receiving (502, 552) an access request for an encrypted file (401-403) by an application (110); determining (503, 553) the application (110) making the access request; checking (505, 555) if the application (110) is authorised for access; and if authorised, allowing the access request. The access request may be a read or write access by a destination or source application (110). If the application (110) is authorised for access, the method checks (508, 558) if the application (110) is authorised for unencrypted access; and if so, allowing unencrypted file access.

8 Claims, 7 Drawing Sheets

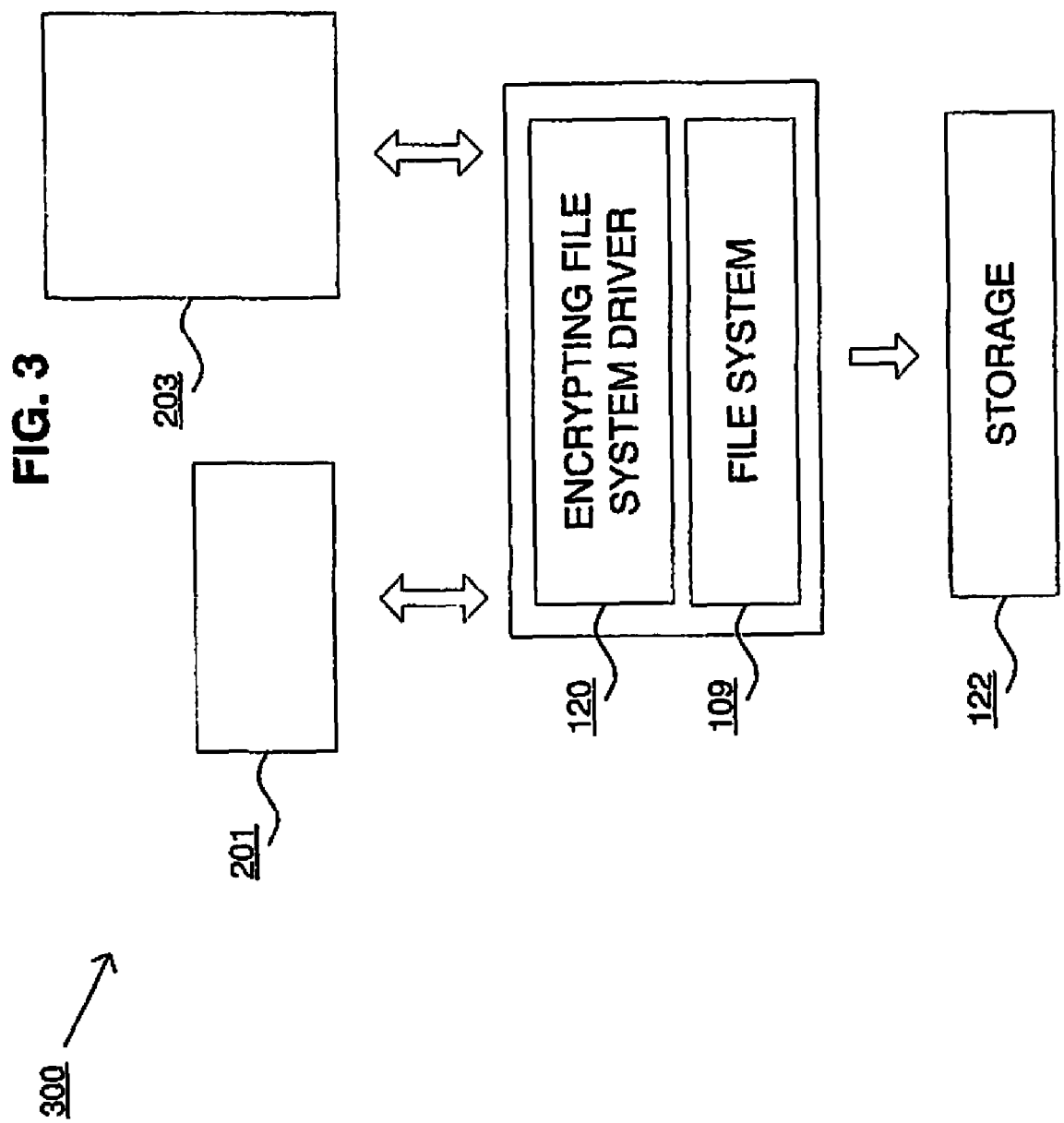

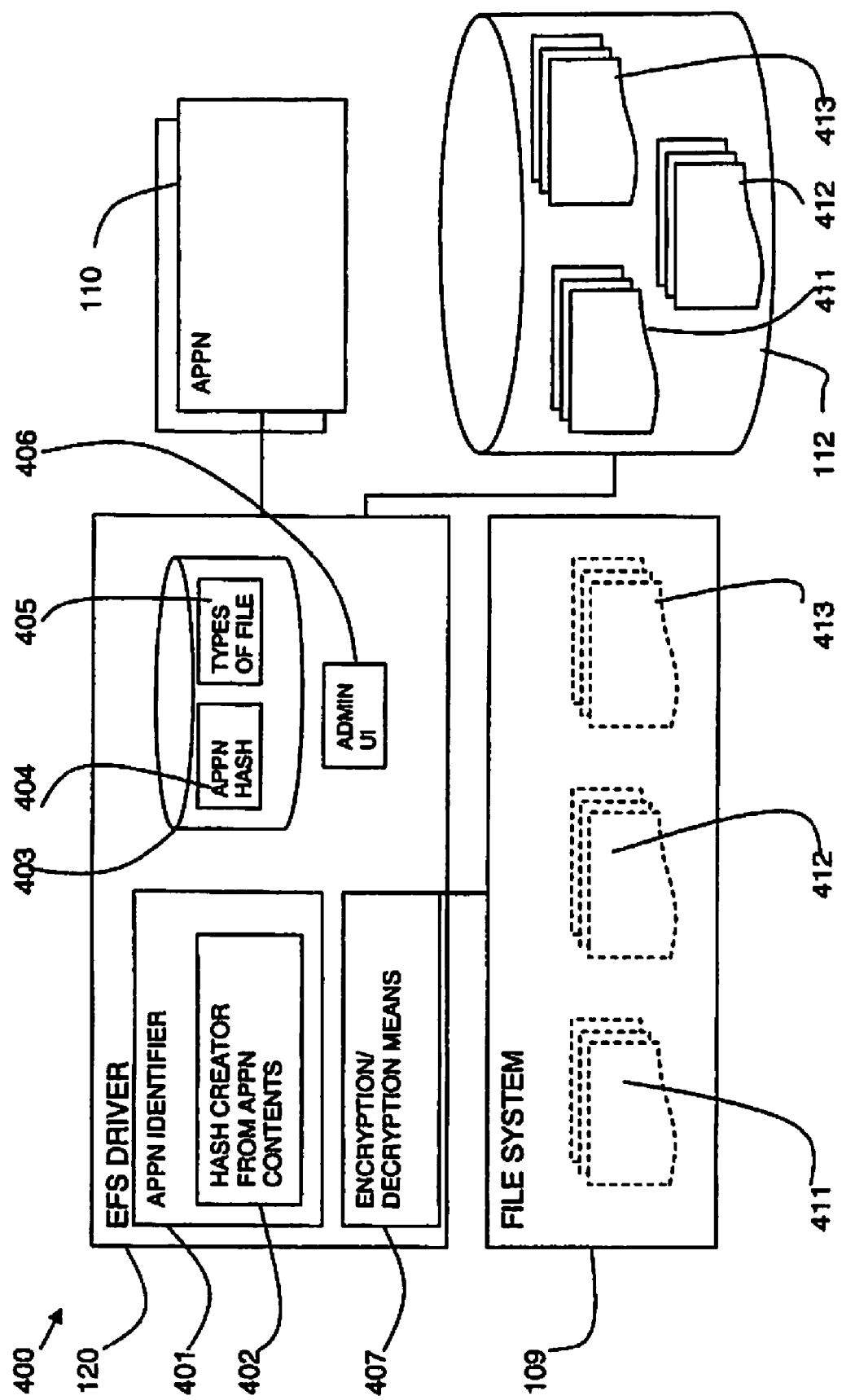

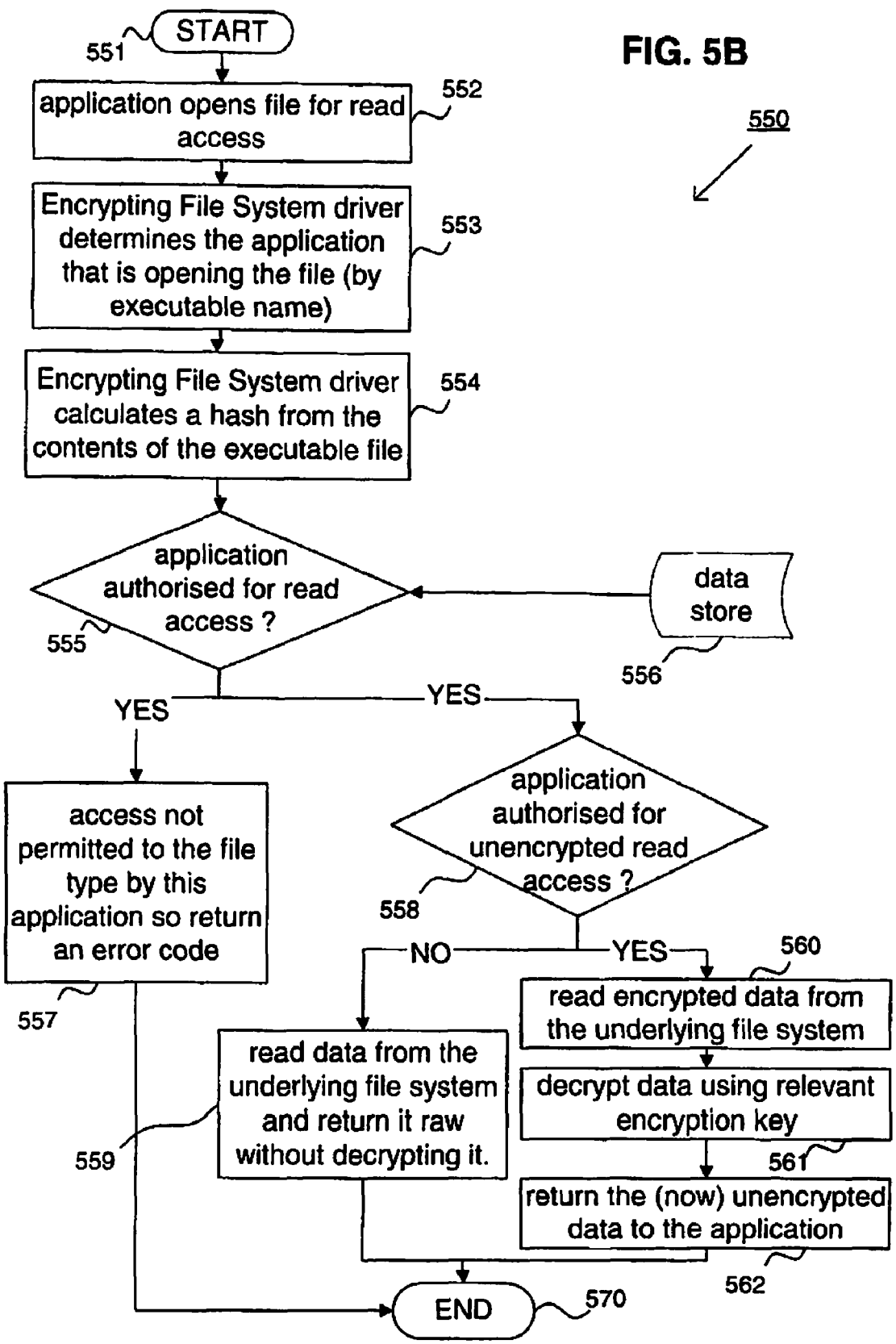

METHOD AND SYSTEM FOR ENCRYPTED FILE ACCESS

CROSS-REFERENCE TO RELATED APPLICATIONS

This application claims priority under 35 U.S.C. §119(a) to European Patent Application Serial Number 08150873.1, filed 31 Jan. 2008, entitled "METHOD AND SYSTEM FOR ENCRYPTED FILE ACCESS", the entirety of which is incorporated herein by reference.

This invention relates to the field of encrypted file access. In particular, the invention relates to file access through an encrypting system based on the accessing application.

Backup of data has become very important as the amount of data produced by enterprises and personal users has increased. The security of backup data must be maintained to prevent unauthorised access to the backed up data.

Many home users now backup their computers to the Internet and several anti-virus packages offer Internet storage facilities. The problem with such facilities is that since the servers are publicly visible on the Internet, the security of the user's information is heavily dependent on the application. This is very fragile given that bulk file encryption is typically done with a less secure symmetric key. If the application's security is cracked, the user's personal information (such as financial documents) is compromised with a corresponding risk of fraud and identity theft.

Another form of backup is an encrypting file system which allows applications to access the contents of a file in clear, while the actual data is stored on disk encrypted. If the storage media is stolen then an adversary has considerable work to decrypt the data. So that existing applications continue to work as before, encrypting file systems decrypt data into clear through the standard file system application programming interfaces (APIs).

However, a problem arises if a virus, such as a Trojan horse or a worm, infiltrates the computer and accesses the stored data by the route of applications' access. Malicious software can scan the hard disk and copy documents to the Internet.

An aim of the present invention is to provide an enhanced encrypting file system in which the encrypting file system conditionally decrypts data depending on the destination application. The encrypting file system may also conditionally encrypt data depending on the source application of the data.

According to a first aspect of the present invention there is provided a method for file access in a file encryption system, comprising: receiving an access request for an encrypted file by an application; determining the application making the access request; checking if the application is authorised for access; and if authorised, allowing the access request.

If the application is authorised for access, the method may include checking if the application is authorised for unencrypted access and, if so, allowing unencrypted file access.

The step of determining the application making the access request may include calculating a hash value of the contents of the application. Calculating a hash value of the contents of the application may apply a hash function to the executable file of the application.

The step of checking if the application is authorised for access may include checking a record of file types to which an application is authorised for access. Checking a record of file types to which an application is authorised for access may include checking the record for the hash value of the application.

The record of file types to which an application is authorised for access may be administered by a security policy. The security policy may have a secure user interface for updating by an administrator. The security policy may be a group policy for a plurality of file encryption systems.

The access request may be a read request by a destination application. An application authorised for read access, but not for unencrypted read access, may only be allowed access to the encrypted file.

The access request may be a write request by a source application. An application authorised for write access, but not for unencrypted write access, may only be allowed access to the encrypted file by writing an encrypted file.

According to a second aspect of the present invention there is provided a computer program product stored on a computer readable storage medium for encrypted file access, comprising computer readable program code means for performing the steps of: receiving an access request for an encrypted file by an application; determining the application making the access request; checking if the application is authorised for access; and if authorised, allowing the access request.

According to a third aspect of the present invention there is provided a method of providing a service to a customer over a network, the service comprising: receiving an access request for an encrypted file by an application; determining the application making the access request; checking if the application is authorised for access; and if authorised, allowing the access request.

According to a fourth aspect of the present invention there is provided a file encryption system comprising: an application identifier for identifying an application making an access request for an encrypted file; a data store of application permissions for accessing file types; means for checking if an application is authorised for access of a file; and means for providing access to the file.

The system may include means for checking if the application is authorised for unencrypted access, and may further include encryption or decryption means for providing access to the unencrypted file.

The application identifier may include a hash function for calculating a hash value of the contents of the application. The hash function for calculating a hash value of the contents of the application may apply the hash function to the executable file of the application. The data store of application permissions for accessing file types may identify applications by the hash value.

The system may also include a security means to administer the data store of application permissions for accessing file types. The security means may have a secure user interface for updating security policy by an administrator. The security means may administer a group policy for a plurality of file encryption systems.

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 3 is a schematic representation of data access in accordance with the present invention; and FIG. 4 is a block diagram of an encryption file system driver in accordance with the present invention;

FIG. 5B is a flow diagram of a method of encryption file system read access in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
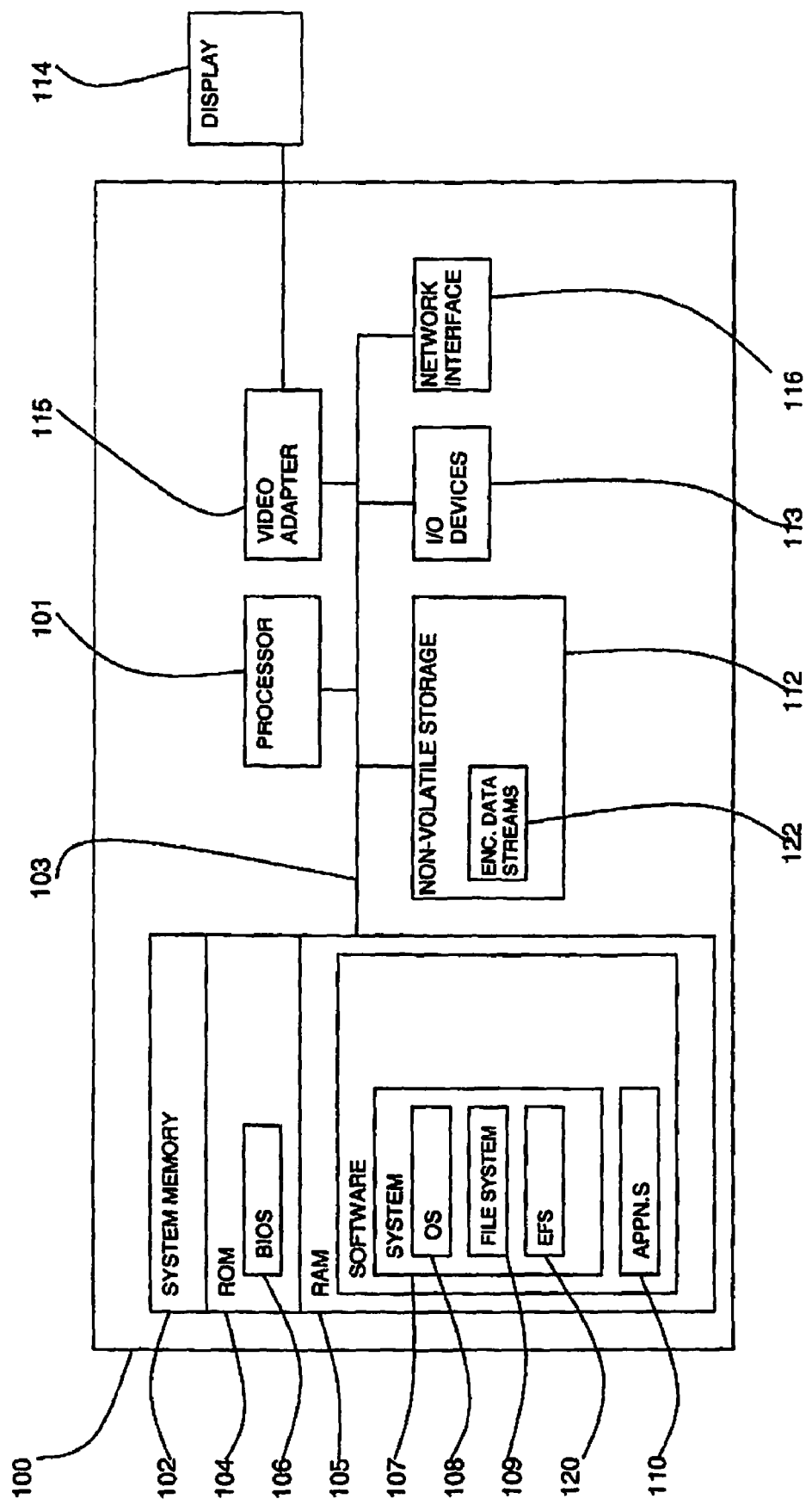
FIG. 1 is a block diagram of a computer system in which the present invention may be implemented.

Referring to FIG. 1, a computer system 100 is shown within which the present invention may be implemented. The computer system 100 may be a server, workstation, or a combination thereof and may be connected to other computer-based resources. The computer system 100 is suitable for storing and/or executing program code and includes at least one processor 101 coupled directly or indirectly to memory elements through a bus system 103. The memory elements can include local memory employed during actual execution of the program code, bulk storage, and cache memories which provide temporary storage of at least some program code in order to reduce the number of times code must be retrieved from bulk storage during execution.

The memory elements may include system memory 102 in the form of read only memory (ROM) 104 and random access memory (RAM) 105. A basic input/output system (BIOS) 106 may be stored in ROM 104. System software 107 may be stored in RAM 105 including an operating system 108. A file system 109 associated with or included in the operating system 108 may also be stored in RAM 105. Software applications 110 may also be stored in RAM 105 which interface with the operating system 108 and file system 109 through application programming interfaces (APIs).

The computer system 100 also includes non-volatile storage means 112 such as primary storage including a magnetic hard disk drive and secondary storage including magnetic and optical disc drives and USB storage devices. The drives and their associated computer-readable media provide non-volatile storage of computer-executable instructions, data structures, program modules and other data for the system 100. Software applications may be stored on the non-volatile storage means 112 as well as the system memory 102.

The computer system 100 may operate in a networked environment using logical connections to one or more remote computers via a network adapter 116.

Input/output devices 113 can be coupled to the system either directly or through intervening I/O controllers. A user may enter commands and information into the system 100 through input devices such as a keyboard, pointing device, or other input devices (for example, microphone, joy stick, game pad, satellite dish, scanner, or the like). Output devices may include speakers, printers, etc. A display device 114 is also connected to system bus 103 via an interface, such as video adapter 115.

The file system 109 connects through a device driver to communicate with a non-volatile storage device 112 and to mange the files thereon. A file system 109 generally includes methods for storing, referencing, sharing and securing files, accessing file data, and maintaining file integrity. There may not be a clear distinction between the file system 109 and the associated operating system 108 and any of the processes carried out by the file system 109 may be performed by the operating system 108.

The file system 109 operations may use an encryption file system driver 120 which may be provided as part of the file system 109, the operating system 108, or separately. The encrypting file system driver 120 is layered on top of the file system 109 and provides support to communicate with an encrypting file system client service and to store files as encrypted data streams 122, 123 in non-volatile storage 112.

File system-level encryption, often called file or folder encryption, is a form of disk encryption where individual files or directories are encrypted by the file system itself. This is in contrast to full disk encryption where the entire partition or disk, in which the file system resides, is encrypted.

The advantages of file system-level encryption include:
flexible file-based key management, so that each file can and usually is encrypted with a separate encryption key;
individual management of encrypted files, e.g. incremental backups of the individual changed files even in encrypted form, rather than backup of the entire encrypted volume;
access control can be enforced through the use of public-key cryptography; and
the fact that cryptographic keys are only held in memory while the file that is decrypted by them is held open.

Unlike cryptographic file systems or full disk encryption, general-purpose file systems that include file system-level encryption do not typically encrypt file system metadata, such as the directory structure, file names, sizes or modification timestamps.

An encrypting file system is a file system driver with file system-level encryption available in some operating systems. The technology transparently allows files to be encrypted on file systems to protect confidential data from attackers with physical access to the computer.

User authentication and access control lists can protect files from unauthorized access while the operating system is running, but can be circumvented if an attacker gains physical access to the computer. One solution is to store the files encrypted on the disks of the computer. An encrypting file system usually does this using public key cryptography, and aims to ensure that decrypting the files requires the correct key.

Figure 2A:
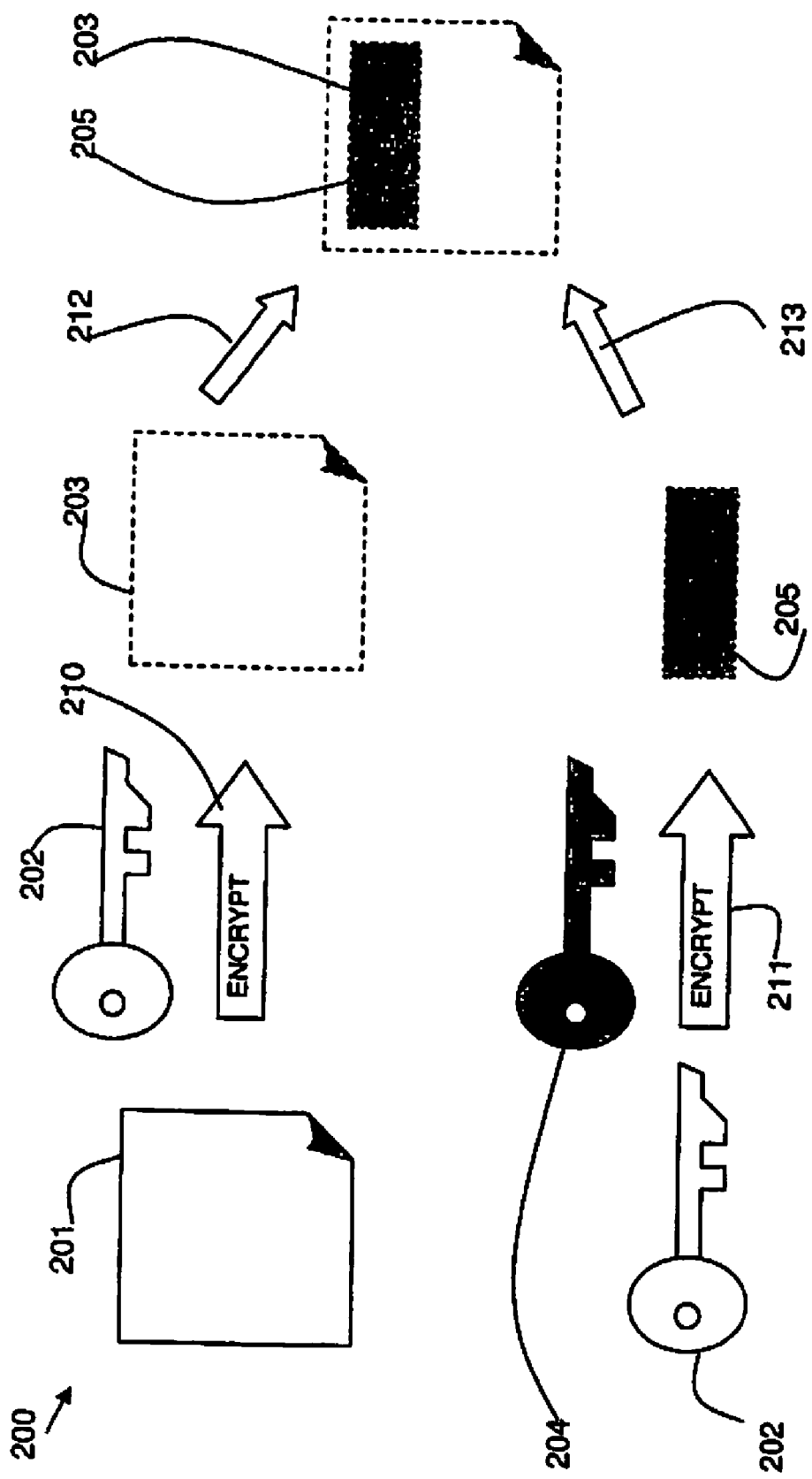
FIG. 2A is a schematic diagram of a file encryption process used in accordance with the present invention.

Referring to FIG. 2A, an example method 200 of the operation of an encrypting file system when encrypting a file is illustrated. A file 201 is encrypted 210 with a bulk symmetric key also known as the file encryption key (FEK) 202, to produce an encrypted file 203. Simultaneously, the FEK 202 is encrypted 211 using the user's public key 204 to produce an encrypted FEK 205. The encrypted file 203 and the encrypted FEK 205 are stored 212, 213 in alternative data streams or with the encrypted FEK 205 in the header of the encrypted file 203.

Encrypting file systems use a symmetric encryption algorithm because it takes a relatively smaller amount of time to encrypt and decrypt large amounts of data than if an asymmetric key cipher is used. The symmetric encryption algorithm used will vary depending on the version and configuration of the operating system. The FEK is encrypted with a public key that is associated with the user who encrypted the file.

Figure 2B:
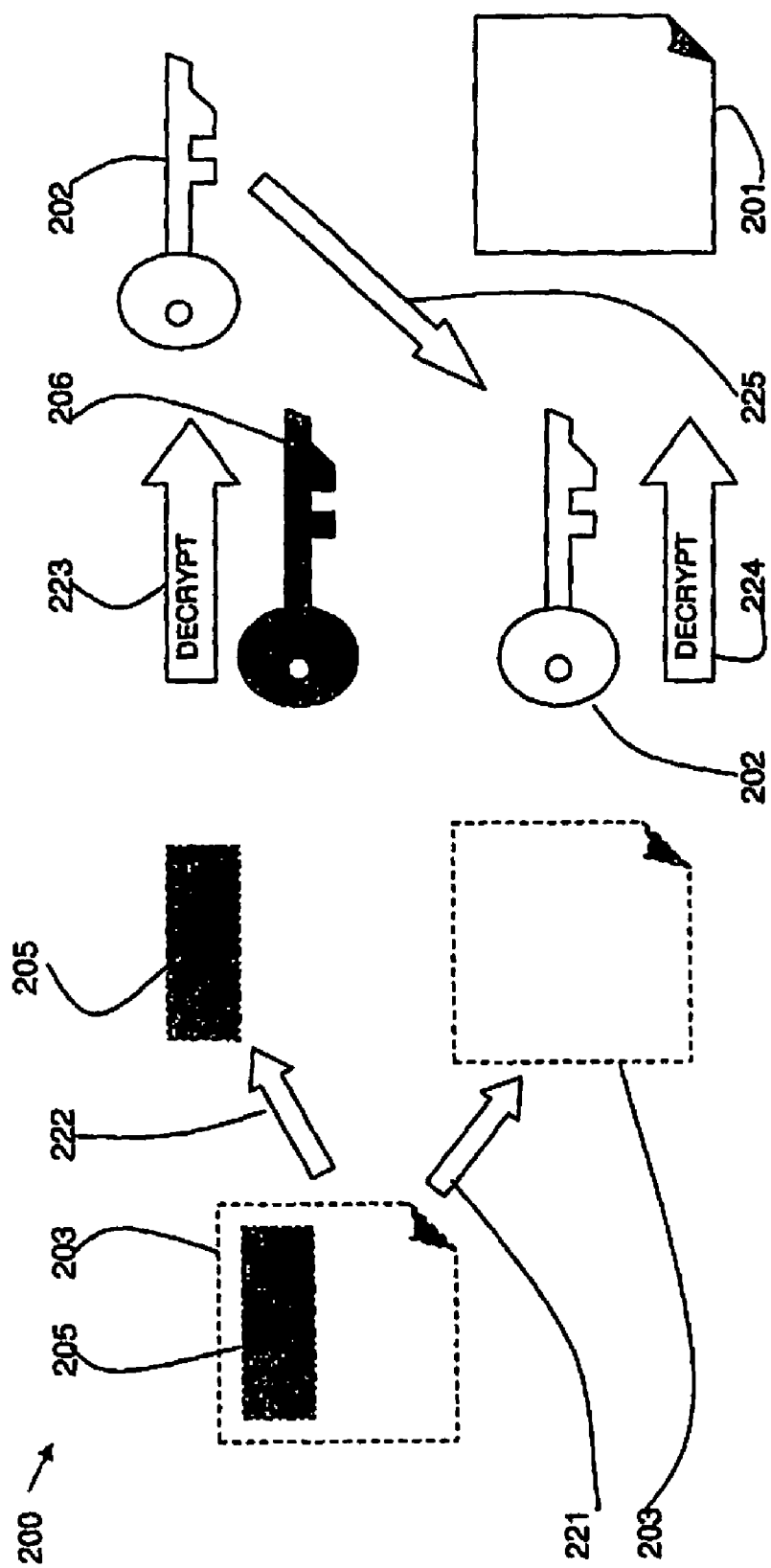
FIG. 2B is a schematic diagram of a file decryption process used in accordance with the present invention.

Referring to FIG. 2B, an example method 220 of the operation of an encrypting file system when decrypting a file is illustrated. The encrypted file 203 and encrypted FEK 205 are separated 221, 222. The encrypted FEK 205 is decrypted 223 using the user's private key 206 to obtain the FEK 202. The FEK 202 is used 225 to decrypt 224 the encrypted file 203 to produce the original file 201.

To decrypt the file, the encrypting file system driver uses the private key that matches the encrypting file system digital certificate (used to encrypt the file) to decrypt the symmetric key that is stored in the encrypting file system stream. The encrypting file system driver uses the symmetric key to decrypt the file. As the encryption and decryption operations are performed at a layer below the file system, it is transparent to the user and all his applications.

Folders whose contents are to be encrypted by the file system are marked with an encryption attribute. The encrypting file system component driver treats this encryption attribute in a way that is analogous to the inheritance of file permissions in the file system. If a folder is marked for encryption, then by default all files and subfolders that are created under the folder are also encrypted. When encrypted files are moved within a file system volume, the files remain encrypted.

An enhanced encrypting file system is now described in which the encrypting file system conditionally decrypts data depending on the destination application. The encrypting file system driver is configurable so, for example, an encrypting file system driver might allow the application Microsoft Excel (Microsoft and Excel are trade marks of Microsoft Corporation) to read spreadsheets in the clear. In this case the encrypting file system driver would decrypt any spreadsheet files where the destination process is C:\Program Files\Microsoft Office\Office\excel.exe. However, a backup application would not be granted the same access to decrypted spreadsheet data and so any data it read would be returned encrypted. This extension to encrypting file systems also catches malicious software such as viruses that are scanning the hard disk and copying documents to the Internet.

Referring to FIG. 3, a schematic diagram 300 is provided of an enhanced encrypting file system driver 120 in which the encrypting file system driver 120 conditionally decrypts data depending on the destination application. The enhanced encrypting file system driver 120 may also conditionally encrypt data depending on the source application. An encrypting file system driver 120 is provided in conjunction with a file system 120 as previously described. The file system 109 accesses data files and folders stored in non-volatile storage 122.

A recognized application, for example, Microsoft Excel, is granted access to the clear text contents of the spreadsheet file. When the application reads the file, the encrypting file system driver 120 allows the file contents to be decrypted and accessed by the application in its decrypted form 201.

Any application or process that does not match a list of allowed applications is passed the encrypted file contents 203. This includes applications such as well known backup applications. However, this also includes Trojan horses and other viruses which may be trying to access a file. The encrypting file system driver 120 is responsible for checking the destination process and encrypting the file contents, if required.

The encrypting file system driver 120 can provide additional security checks on applications and does not rely on the application's executable file name for authentication of the application. For example, a hash of the destination application can be checked to ensure that an adversary has not copied their own Trojan horse application named "excel.exe" into the file address "C:\Program Files\Microsoft Office\Office".

Referring to FIG. 4, a block diagram of a system 400 including an enhanced encrypting file system driver 120 is shown. The encrypting file system driver 120 includes an encryption/decryption means 407 for encrypting and decrypting files. The encrypting file system driver 120 is coupled to a file system 109 for managing files 411-413 stored on non-volatile storage 112. Applications 110 attempt read and write accesses of the files 411-413.

The encrypting file system driver 120 includes an application identifier 401 which includes a hash function or other form of signature generator 402 to create a hash or signature from the contents of the accessing application 110. With a hash function, the executable file for the application is used as the input data and is fed through the hash function. This produces a small fingerprint which identifies the application and which is very unlikely to collide with anything else fed through the hash function. The reason for the use of the hash function is to stop a potential adversary putting together an impostor executable file which has the same fingerprint as the real executable file.

Hash functions are designed to be fast and to yield few hash collisions in expected input domains. A hash function must be deterministic, i.e. if two hashes generated by the same hash function are different, then the two inputs were different in some way.

A desirable property of a hash function is the mixing property: a small change in the input (e.g. one bit) should cause a large change in the output (e.g. about half of the bits). This is called the avalanche effect.

Cryptographic hash functions assume the existence of an adversary who can deliberately try to find inputs with the same hash value. A well designed cryptographic hash function is a "one-way" operation: there is no practical way to calculate a particular data input that will result in a desired hash value, so it is also very difficult to forge. Functions intended for cryptographic hashing, such as MD5, are commonly used as stock hash functions.

The encrypting file system driver 120 also includes a data store 403 with a record of application names 404 which may be the application hashes or derived therefrom, and types of files 405 to which the applications are allowed access. The data store 403 may be administered by a security policy. The data store 403 may include two levels of access. A first level of access is for applications which are authorized for unencrypted file access. A second level of access is for applications which are only authorized for encrypted file access. This second level may include applications in a write access in which the data is already encrypted. This second level may also include applications in a read access which are only allowed the raw encrypted data, for example, backup applications.

A user interface 406 may be used for administration of the data store contents. The information of application names 404 and types of files 405 to which the applications are allowed access may be distributed as part of an enterprise security policy.

Using a domain or group policy, a system administrator can define a policy just once and it will be applied to a whole group of users/computers. In the described system, for a customer running a network of users/computers, the configuration of the encrypting file system driver can be configured through a domain or group policy. This allows the system administrator to configure the data store of applications. For example, it could be configured so that only Excel should be allowed to read and write spreadsheets.

The configuration information can be stored in many different places, such as a file on a local machine's hard disk. The only requirement is that access to the information is tightly controlled so that a potential adversary cannot gain access to it. If the information is stored in a local file then this security can be achieved by only granting the encrypting file system driver and perhaps the system administrator access to the file. A user interface is simply provides a way for an authorised user such as a system administrator to view the current configuration and make changes if need be.

Figure 5A:
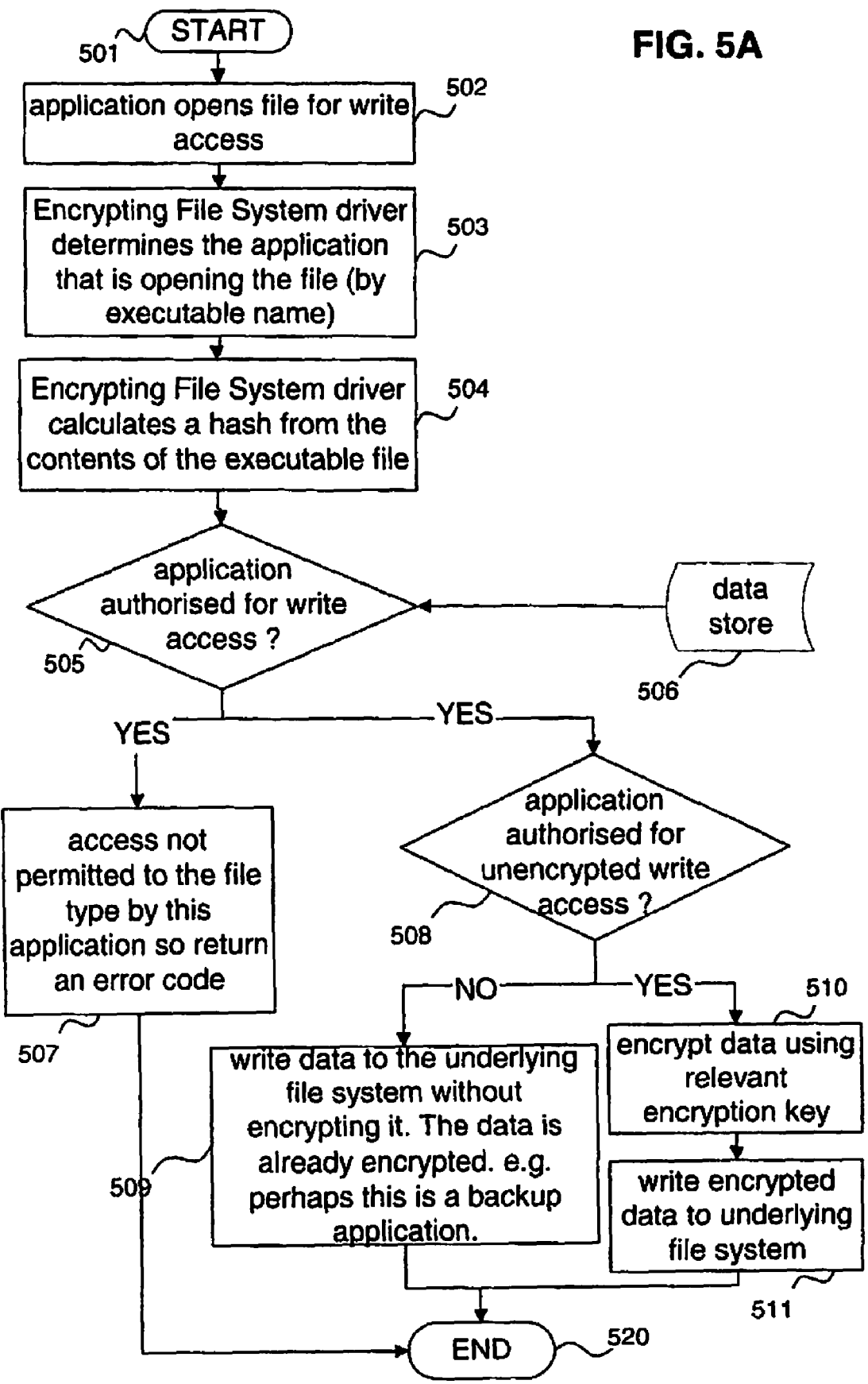
FIG. 5A is a flow diagram of a method of encryption file system write access in accordance with the present invention.

Referring to FIG. 5A, a flow diagram 500 shows the process of a write access by an application 110. The process starts 501 and an application opens a file for write access 502. The encrypting file system driver determines 503 the application that is opening the file. This may be done by determining the application executable file name.

The encrypting file system driver calculates 504 a hash from the contents of the executable file. A hash is calculated so that the driver can check the application making the request. Only using the executable file name to determine if an application should be granted access to a file is not sufficient since an adversary (virus, Trojan horse, or worm) may have replaced the application with its own version that operates differently.

It is then determined 505 if the application is authorized for write access. This checks whether the application is allowed unencrypted access to the file. This check is in addition to any other operating system checks such as whether the current user has permissions to access the file. The determination 505 of whether of not the application is authorized for write access, references the data store 506 which stores a list of the applications and types of files that they have been granted permission to access.

If access is not permitted to the file type by this application, an error code is returned 507 and the process ends 520.

If access is permitted to the file type by this application, it is determined 508 if the application is authorized for unencrypted write access.

If the application is authorized for encrypted write access, data is written 509 to the underlying file system without encrypting it. This is because the data is already be encrypted, for example, if the application is a backup application. The process then ends 520.

If the application is authorized for unencrypted write access, data is then encrypted 510 using the relevant encryption key. There are several different embodiments possible in key selection. A simplistic implementation uses a single key on a computer to encrypt and decrypt all data to its local file system. A more sophisticated embodiment could use multiple keys, perhaps a different key for each and every file.

The encrypted data is written 511 to the underlying file system, and the process ends 520.

Referring to FIG. 5B, a flow diagram 550 shows the corresponding process of a read access by an application 110. The process starts 551 and an application opens a file for read access 552. The encrypting file system driver determines 553 the application that is opening the file. This may be done by determining the application executable file name.

The encrypting file system driver calculates 554 a hash from the contents of the executable file. A hash is calculated so that the driver can check the application making the request.

It is then determined 555 if the application is authorized for read access. This checks whether the application is allowed unencrypted access to the file. The determination 555 of whether of not the application is authorized for read access, references the data store 556 which stores a list of the applications and types of files that they have been granted permission to access.

If access is not permitted to the file type by this application, an error code is returned 557 and the process ends 570.

If access is permitted to the file type by this application, it is determined 558 if the application is authorized for unencrypted read access.

If the application is not authorized for unencrypted read access, data is read 559 from the underlying file system and returned in its raw state without decrypting it. The process then ends 570.

If the application is authorized for unencrypted write access, the encrypted data is read 560 from the underlying file system. The data is then decrypted 561 using the relevant encryption key. As with write encryption, there are several different embodiments possible in key selection. A simplistic implementation uses a single key on a computer to encrypt and decrypt all data to its local file system. A more sophisticated embodiment could use multiple keys, perhaps a different key for each and every file.

The now decrypted data is returned 562 to the application, and the process ends 520.

Some known encrypting file systems provide access to the underlying raw encrypted data; however, this is done through a separate set of APIs. This does not provide the ability to configure access based on destination application or process.

An encrypting file system driver alone or as part of a file system may be provided as a service to a customer over a network.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for file access in a file encryption system, comprising:
receiving an access request for an encrypted file by an application;
determining
if the application is authorized for access to the encrypted file by checking a name of the application and a file type of the encrypted file against a list of applications and types of files that the applications have been granted permission to access;

upon determining that the application is authorized to access the encrypted file, further determining if the application is authorized for access to an unencrypted version of the encrypted file by calculating a hash value of contents of the application and checking the calculated hash value against a list of allowable hash values; and upon determining that the application is authorized for access to an unencrypted version of the encrypted file, decrypting the encrypted file and returning the decrypted file to the application, otherwise returning the encrypted file to the application;

wherein the list of applications and types of files that the applications have been granted permission to access and the list of allowable hash values are administered by a security policy.

2. The method as claimed in claim 1, wherein the security policy has a secure user interface for updating by an administrator.

3. The method as claimed in claim 1, wherein the security policy is a group policy for a plurality of file encryption systems.

4. The method as claimed in claim 1, wherein the access request is a read request by a destination application.

5. The method as claimed in claim 4, wherein an application authorized for read access, but not for unencrypted read access, is allowed access to the encrypted file.

6. The method as claimed in claim 1, wherein the access request is a write request by a source application.

7. The method as claimed in claim 6, wherein an application authorized for write access, but not for unencrypted write access, is allowed access to the encrypted file by writing an encrypted file.

8. A computer program product for encrypted file access, the computer program product comprising:

a non-transitory computer-readable storage medium having computer readable program code embodied therewith, the computer readable program code, when executed by a computer, causes the computer to perform the steps comprising:

receiving an access request for an encrypted file by an application;

determining if the application is authorized for access to the encrypted file by checking a name of the application and a file type of the encrypted file against a list of applications and types of files that the applications have been granted permission to access;

upon determining that the application is authorized to access the encrypted file, further determining if the application is authorized for access to an unencrypted version of the encrypted file by calculating a hash value of contents of the application and checking the calculated hash value against a list of allowable hash values; and upon determining that the application is authorized for access to an unencrypted version of the encrypted file, decrypting the encrypted file and returning the decrypted file to the application, otherwise returning the encrypted file to the application;

wherein the list of applications and types of files that the applications have been granted permission to access and the list of allowable hash values are administered by a security policy.

\* \* \* \* \*